June 2, 1964     G. P. TAGGART     3,135,669
PURIFICATION OF MALEIC ANHYDRIDE BY FLASH VAPORIZATION
AND TWO STAGE FRACTIONAL DISTILLATION
Filed Oct. 16, 1961
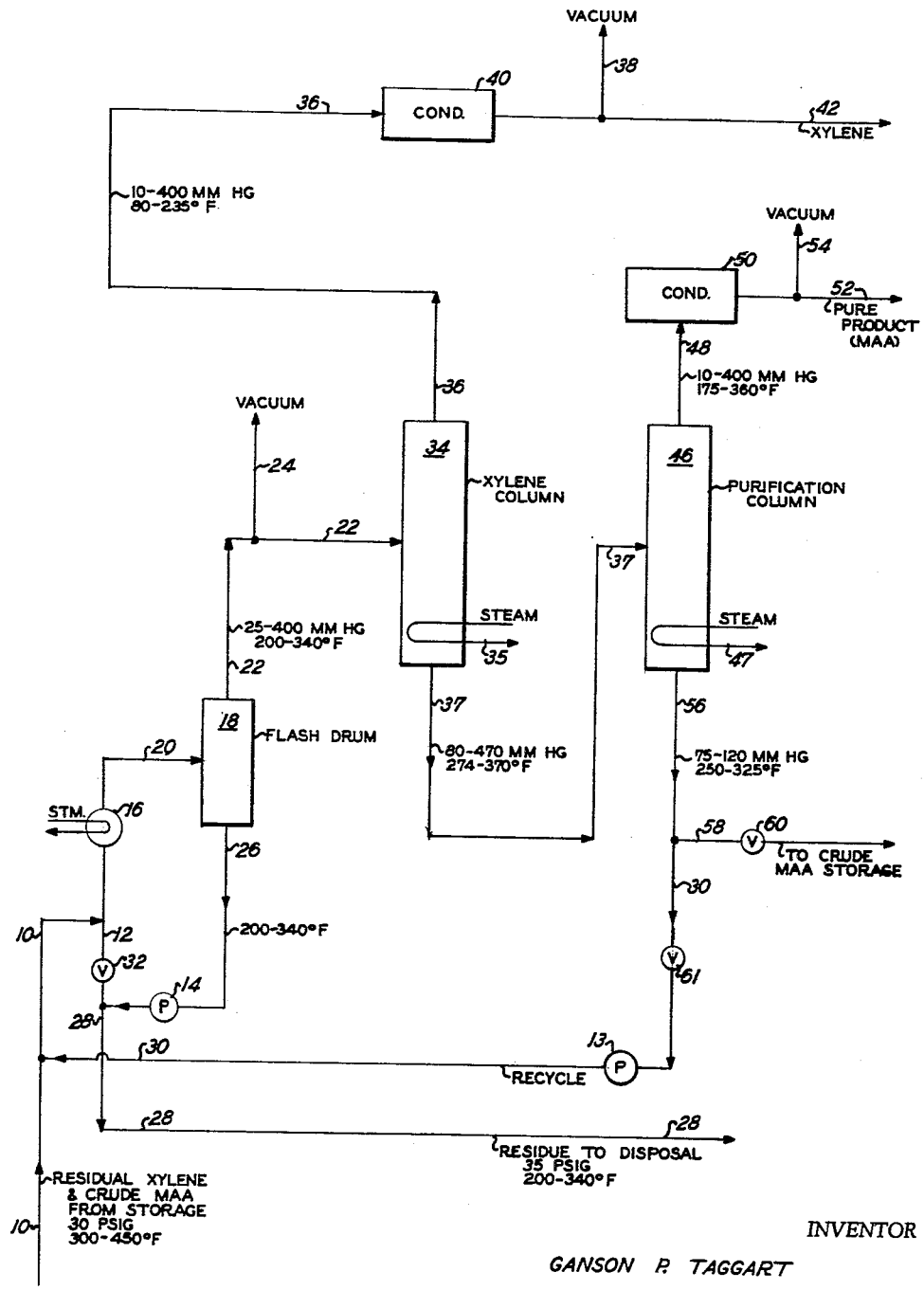
INVENTOR
GANSON P. TAGGART
BY
ATTORNEY United States Patent Office 3,135,669
Patented June 2, 1964

3,135,669
PURIFICATION OF MALEIC ANHYDRIDE BY FLASH VAPORIZATION AND TWO STAGE FRACTIONAL DISTILLATION
Ganson P. Taggart, Winchester, Mass., assignor to The Badger Company, Inc., a corporation of Massachusetts
Filed Oct. 16, 1961, Ser. No. 145,398
6 Claims. (Cl. 202—52)

This invention relates to a method of continuous purification of maleic anhydride, and particularly to a method of purification of maleic anhydride by continuous distillation in a manner to obtain higher yields of pure product, while effecting important economies.

Maleic anhydride, as produced by oxidation of hydrocarbon, normally occurs admixed with heavy tarry ends, comprising heavy aromatics and tars, usually nonvolatile at high temperature. The crude product further includes substantial quantities of volatile substances such as xylenes, other naphtha components and partial oxidation products thereof.

The known purification methods in the art were either to extract or, more commonly, to distill the maleic anhydride, fractionally separating both the volatile hydrocarbon impurities and the maleic anhydride overhead, leaving large residues in the still including much maleic anhydride and tars intermixed in a crude form from which recovery of residual maleic anhydride as such was uneconomical. Moreover, operating a still in an interrupted heat cycle with a need to clean solids from the still, batchwise, comprised an important loss purely manipulatively from the aspect of heat requirements and manual labor for that operation.

According to the present invention, I have found that improved economies are available in continuous distillation of maleic anhydride.

In broad aspect, the crude maleic anhydride at a high temperature, below its decomposition point, is continuously flashed to remove all volatiles, thereby separating nonvolatile tars from vapors which include the recoverable maleic anhydride. Such vapors then are continuously fractionally condensed in a distillation column to separate volatile impurities such as xylenes and all other more volatile impurities from the maleic anhydride. Finally, the maleic anhydride is continuously distilled as a pure overhead product.

By operating under the vacuum conditions at each distillation stage as the feed passes continuously from stage to stage, polymerization is reduced. There is lower accumulation of impurities in continuous flow from stage to stage. Any final impure maleic anhydride residues can be continuously recycled so that ultimately high yields of pure maleic anhydride are possible. By first removal of tars and working essentially only on stable volatiles, there is less subsequent decomposition in the distillation system. By continuous operation there is a faster throughput, less heat exposure time and consequently less decomposition in the system. This is of great importance in a system where products are solids which could accumulate in the system and can plug it, so that continuous operation for distilling this material is not only an improvement, but the development of such system required unusual and careful engineering design.

The invention is further described in relation to the drawing in which the single figure illustrates diagrammatically the several distillation stages interconnected to a continuous purification system.

Crude maleic anhydride from an oxidation reaction containing more volatile hydrocarbon, typically xylenes, less volatile tars and other intermediate oxidation products, is passed continuously into this system through line 10 and may be mixed with some crude recycle entering line 10 from line 30 at an initial system pressure of 30 to 35 p.s.i.g. as impelled by recycle pump 13, the composite being heated in exchanger 16 and thence passed to flash drum 18 continuously by way of line 20. The temperature of the feed entering flash drum 18 is regulated to the range of 300 to 450° F., preferably 350 to 400° F., for example about 360 to 380° F.

In the flash drum the pressure is reduced to the range of 25 to 40 mm. Hg, preferably about 200 to 250 mm. Hg, applied through overhead line 22 through a vacuum line 24 so that the vapors consisting of all of the maleic anhydride and high volatiles such as xylenes and other impurities pass overhead through line 22 at a temperature of about 200 to 340° F., preferably 300 to 315° F. The tars separated in flash drum 18, also at a temperature of about 200 to 340° F., preferably 300 to 315° F., are withdrawn as liquid bottoms through line 26. The tars are picked up from line 26 by pump 14 and sent to disposal as a residue through line 28 at any convenient pumping pressure, for example, the operating pressure of the system at about 35 p.s.i.g., but the system will allow some recycle through valve 32 if desired.

The flashed overhead vapors in line 22 at said pressure enter the second stage volatile impurity, such as xylene, column 34. This column 34 is maintained at any practical reduced pressure between 10 and 400 mm. Hg, preferably about 150 to 200 mm. Hg, and a temperature between 80 and 235° F., preferably 200 to 210° F., at top overhead line 36, maintained by a vacuum line 38 attached thereto. The overhead vapors, substantially xylenes, are condensed in a condenser 40 to liquid and sent to storage by way of line 42. The crude liquid maleic anhydride bottoms at a column bottom pressure of about 80 to 470 mm. Hg, preferably 200 to 220 mm. Hg, and a temperature controlled by bottom heater 35 to the range of 274 to 370° F., preferably 274 to 325° F., is passed by way of line 44 to the final purification column 46 from which the pure maleic anhydride is fractionally distilled as the pure overhead product. A column top pressure of 10 to 40 mm. Hg, preferably about 50 to 100 mm. Hg, and a temperature of about 175 to 360° F., preferably 225 to 285° F., are maintained, and the pure maleic anhydride passing overhead through line 48 is condensed by condenser 50 and withdrawn through product line 52. The reduced pressure is applied to the purification column 46 by way of line 54. The crude maleic anhydride residue bottoms at a pressure of 80 to 470 mm. Hg, preferably 80 to 120 mm. Hg, and a temperature maintained by heater 47 to the range of 230 to 325° F., leaving the column through line 56, may be sent to storage by way of line 58, or the bottoms may be recycled for redistillation through line 30 by way of pump 13 and line 10.

The following example illustrates a preferred practice of this invention:

*Example I*

Crude maleic anhydride analyzing about 8% xylene, about 2% unidentifiable oxidized hydrocarbon, 85% maleic anhydride and the balance being heavy hydrocarbons, higher oxidation impurities and tars, is preheated to a temperature of 390° F. and continuously passed to a flash drum 18 at a positive pumping pressure of about 35 p.s.i.g., the drum 18 being maintained under a vacuum of about 220 mm. Hg, the flashed vapors passing overhead at about 315° F. Nonvolatile tars at about this temperature are withdrawn from the drum bottom and pumped as a liquid residue for disposal through line 28 by way of pump 14 at a pressure of about 35 p.s.i.g. The vapors in line 22 are sent to a xylene column in which a vacuum of 170 mm. Hg is maintained. The overhead temperature is adjusted to 215° F. and the overhead xylene vapors and other close boiling impurities are condensed in the condenser 40 and withdrawn from the system. The residual crude maleic anhydride withdrawn from the column 34 at a bottom pressure of 230 mm. Hg is heated to a temperature of 325° F. and passed by way of line 44 to the purification column 46. That column is maintained at a top pressure of 60 mm. Hg, the pure maleic anhydride vapors being passed overhead at a temperature of about 230° F. and condensed to pure liquid in condenser 50. The bottoms withdrawn through line 56 may be passed to crude maleic anhydride storage by way of line 58 and then recycled from storage to line 10 in a manner not shown, after short storage intervals. Alternately, the total bottoms in line 56 may be continuously recycled through line 30 by way of pump 13 to line 10 for further distillation. The immediate recycle flow through line 30 or alternately to storage by way of line 58 is controlled by valves 60 and 61. As operated in this manner, maleic anhydride is produced continuously in condition exceeding 98% purity, in yields of 96 to 99%.

As thus described, maleic anhydride is continuously purified of both tars and more volatile impurities such as xylenes in a series of stills. By adjusting the vacuum and temperature in each stage, progressively great heat economies are possible while producing pure maleic anhydride in high yields. Besides greater heat economy of this system, and continuous production in high yields, there is substantial saving in labor to remove solid impurities batchwise in the commonly operated batch distillations.

I claim:

1. The process of purifying dry crude maleic anhydride containing impurities which include hydrocarbon compounds having a boiling point below that of maleic anhydride, being thereby more volatile than the maleic anhydride, and further containing tarry impurities having a boiling point higher than that of maleic anhydride and being thereby less volatile, both types of impurities associated with the maleic anhydride resulting from oxidation of hydrocarbon in the formation of the maleic anhydride, comprising heating said crude maleic anhydride above its boiling point sufficient not only to vaporize the said more volatile impurity components, together with all of the maleic anhydride, but also to vaporize some of the less volatile components contained in the tarry impurities, thereafter flashing the said heated crude maleic anhydride mixture in a flash drum to immediately vaporize all of said vaporizable components, passing said vapors to a distillation column controlled to a temperature and pressure to remove as vaporized overhead all of the said more volatile components in said column and leaving as liquid residue both maleic anhydride and said less volatile components that were first vaporized therewith, and passing the said liquid residue to a second distillation column controlled in temperature and pressure to separate as overhead vapors pure maleic anhydride and leave in said column the said less volatile impurities as liquid bottoms.

2. The method as defined in claim 1 wherein the crude liquid bottoms of the second distillation column are recycled to the preliminary heating step for redistillation in the system.

3. The method as defined in claim 1 wherein the dry crude maleic anhydride containing impurities is first heated to a temperature in the range of 300 to 450° F. at a positive atmospheric pressure, and passed to the flashing zone maintained at a pressure in the range of 25 to 400 mm. Hg and a temperature in the range of about 200 to 340° F., the flashed vapors then being fractionated in a distillation column maintained at a top pressure in the range of about 10 to 400 mm. Hg and a temperature in the range of about 80 to 235° F., and the liquid withdrawn from said distillation column at a pressure of about 80 to 470 mm. Hg and a temperature of about 274 to 370° F. is passed to a second distillation column maintained at a top pressure of about 10 to 400 mm. Hg and a temperature of about 175 to 360° F. to effect vaporization of pure maleic anhydride and leave impurities and some maleic anhydride as liquid bottoms.

4. The method as defined in claim 3 wherein the liquid bottoms of said second distillation column is recycled to the preliminary heating step for redistillation in the system.

5. The method as defined in claim 1 wherein the dry crude maleic anhydride containing impurities is first heated to a temperature in the range of about 350 to 400° F. at a positive atmospheric pressure, and passed to the flashing zone maintained at a pressure in the range of about 200 to 250 mm. Hg and a temperature in the range of about 300 to 315° F., the flashed vapors then being fractionated in a distillation column maintained at a top pressure in the range of about 150 to 200 mm. Hg and a temperature in the range of about 200 to 210° F., and the liquid residue is withdrawn from said distillation column at a pressure of about 200 to 220 mm. Hg and a temperature of about 225 to 325° F. and passed to a second distillation column maintained at a top pressure of about 50 to 100 mm. Hg and a temperature of about 225 to 285° F.

6. The method as defined in claim 5 wherein the liquid bottoms of said second distillation column is recycled to the preliminary heating step for redistillation in the system.

References Cited in the file of this patent

UNITED STATES PATENTS

| | | |
|---|---|---|
| 1,901,914 | Livingston | Mar. 21, 1933 |
| 2,670,355 | Barsky et al. | Feb. 23, 1954 |
| 2,770,630 | Miller | Nov. 13, 1956 |
| 2,806,861 | Cumming | Sept. 17, 1957 |